United States Patent [19]
Marzocchi et al.

[11] 3,827,230
[45] Aug. 6, 1974

[54] GLASS FIBER SIZE

[75] Inventors: Alfred Marzocchi, East Cumberland; Nicholas S. Janetos, Providence, both of R.I.

[73] Assignee: Owens-Corning Fiberglass Corporation, Toledo, Ohio

[22] Filed: July 27, 1972

[21] Appl. No.: 275,612

Related U.S. Application Data

[63] Continuation-in-part of Ser. No. 28,033, April 13, 1970, abandoned.

[52] U.S. Cl.. 57/140 G, 117/126 GE, 117/126 GN, 117/72, 117/126 GB, 117/126 GS, 161/144, 161/176, 161/170, 57/153, 260/29.3, 260/845, 260/78 SC, 260/29.4
[51] Int. Cl. ............................................. D02g 3/18
[58] Field of Search 117/126 GE, 126 GN, 126 GS, 117/126 GB, 72; 161/144, 176, 170; 57/140 G, 153

[56] References Cited
UNITED STATES PATENTS 2,993,920  7/1961  Budde et al. ................. 117/126 GE
3,252,825  5/1966  Marzocchi et al. ........... 117/126 GN
3,424,608  1/1969  Marzocchi et al. ............ 117/126 GB
3,650,810  3/1972  Marzocchi ..................... 117/126 GS
3,730,759  5/1973  Marzocchi ..................... 117/126 GN

*Primary Examiner*—George F. Lesmes
*Assistant Examiner*—Ellis P. Robinson
*Attorney, Agent, or Firm*—Staeling & Overman

[57]  ABSTRACT

A glass fiber size which is prepared by reaction of an epoxidized ester with an amino compound, a glycidoxy compound or a carboxy compound. In addition, the epoxidized ester can be replaced by a melaminealdehyde resin, a urea-aldehyde resin, a polyamide or a carboxylated butadiene-styrene resin. Glass fibers sized in accordance with the present invention show improved compatibility with impregnants formulated to include a resorcinol-aldehyde resin and an elastomer.

17 Claims, No Drawings

GLASS FIBER SIZE

This application is a continuation-in-part of copending application Ser. No. 28,033, filed Apr. 13, 1970, now abandoned.

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers", as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and nonwoven fabrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured state, vulcanized or unvulcanized stage, and synthetic organic elastomeric materials such as nitriles, acrylic and esters and terpolymers thereof with styrene and acrylonitriles; styrene and vinyl pyridine; and synthetic rubbers as represented by butadiene polymers and copolymers with monoolefins such as butadiene-styrene copolymer, butadiene-acrylonitrile copolymers, butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha monoolefin having from three to 20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2-12 carbon atoms, and polysulfone rubbers.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability and service characteristics in rubber tires, and as a reinforcement and the like in other elastomeric coated fabrics and molded elastomeric products.

It is an object of this invention to provide a new and improved composition which may be used as a forming size for treatment of glass fibers in forming to enable fuller utilization to be made of the desirable characteristics of the glass fibers when used in combination with elastomeric material in the manufacture of glass fiber reinforced molded products and coated products.

More specifically, it is an object of the present invention to provide a composition for use in the treatment of glass fibers in forming to improve the processing and performance characteristics of the glass fibers as a reinforcement for elastomeric materials to enhance their bonding relationship when used in combination with elastomeric material in the manufacture of glass fiber reinforced plastics, laminates or coated fabrics.

These and other advantages of the invention will appear hereinafter and it will be understood that specific examples appearing herein are provided by way of illustration, not by way of limitation, of the principal concepts of the present invention.

Until recently, glass fibers which have been added or otherwise incorporated with elastomeric materials, in the form of continuous or chopped fibers, having functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

A wide variety of size compositions for use with glass fibers are known to the art. Illustrative of the conventional size compositions are those described in U.S. Pat. No. 3,424,608, wherein description is made of conventional size compositions embodying partially dextrinized starch with vegetable oils, polyester resins with polyvinyl alcohol, paraffin waxes with amide polyester resins, in addition to various surface active agents, emulsifiers and organo silane coupling or anchoring agents. Such conventional size compositions are invariably characterized by several different components which have a tendency to migrate on glass fiber surfaces when present thereon as a thin size coating to thereby detrimentally affect the bonding relationship between the glass fiber surfaces and the elastomer with which the glass fibers are combined in the manufacture of glass fiber reinforced elastomeric products.

The present invention will be described with reference to a new and improved composition which can be employed as an original size applied to the glass fibers in forming, or to glass fibers formed on which the original size has been removed, to thereby individually coat each of the glass fiber filaments subsequently formed into the strand, yarn, cord or fabric to provide both the desired processing and performance characteristics for processing the sized glass fibers in the formation of the strand and in the twisting and plying of the strands into yarns or cords, and in the processing of the strands, yarns or cords into fabrics and the desired performance characteristics for enhancing the bonding relationship when the sized glass fibers are combined with elastomeric materials in the manufacture of reinforced elastomeric products.

In accordance with the practice of the present invention, an elastomer compatible material in the form of an epoxidized ester is reacted with an amine, an epoxy compound or a carboxyl compound, and the reaction product is applied as a thin size coating on the individual glass fibers. The glass fibers are then formed into bundles of glass fibers and subjected to impregnation with a composition containing as essential components a resorcinol-aldehyde resin and an elastomer whereby the impregnant serves to fill the interstices between the glass fibers forming the bundle to cushion the fibers to protect the individual fibers from destruction by mutual abrasion and to coat the individual, sized fibers to form a unitary bundle structure having good bonding characteristics with elastomeric materials in the manufacture of glass fiber reinforced elastomeric products.

The epoxidized esters employed in the practice of the invention are characterized by at least one oxirane ring

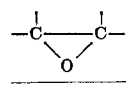   (I)

and at least one ester group

   (II)

Preferred epoxidized esters are those derived from unsaturated aliphatic polycarboxylic acids containing five to 24 carbon atoms and one to four carboxyl groups. Such acids can be defined by the formulae $$R_1 - COOH \quad \text{(III)}$$

and $$HOOC - R_2 - COOH \quad \text{(IV)}$$

wherein $R_1$ is an aliphatic hydrocarbon group containing five to 23 carbon atoms and containing one to three ethylenic double bonds and $R_2$ is a divalent aliphatic hydrocarbon group containing 3 to 22 carbon atoms and containing one to three ethylenic double bonds.

Representative acids include oleic acid, linoleic acid, gadoleic acid, arachidonic acid, cetoleic acid, glutaconic acid, 2-octenedioic acid, 4-pentyl-2,5-heptadienedioic acid, 3-dodecenedioic acid as well as others known to those skilled in the art.

The epoxidized esters employed in the practice of this invention are prepared from such acids by first esterifying the acid with an alkanol or two different alkanols, each of which contains one to 10 carbon atoms, to form the corresponding ester

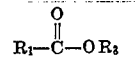   (V)

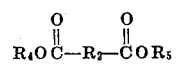   (VI)

wherein $R_3$, $R_4$ and $R_5$ are each alkyl containing one to 10 carbon atoms. The resulting unsaturated esters can then be epoxidized to convert each of the one to three double bonds of $R_1$ or $R_2$ to an epoxy group in a conventional manner by using an epoxidizing agent such as hydrogen peroxide, percarboxylic acids and the like.

The preparation of the epoxidized esters used in the present invention, using oleic and 2-octenedioic acids as illustrative, is outlined below:

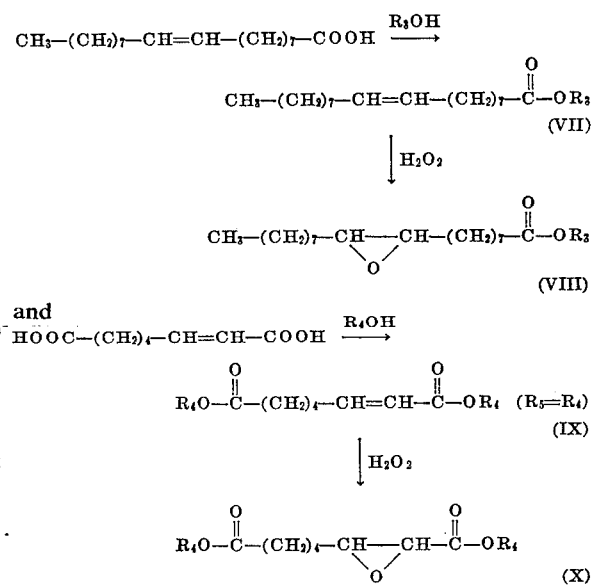

As will be appreciated by those skilled in the art, these reactions can be carried out with any of the acids described above.

Also contemplated for use in the present invention are epoxidized esters derived from hydroxy substituted unsaturated monocarboxylic acids. Such derivatives are prepared by reacting a hydroxy substituted olefinic carboxylic acid ester containing 10 to 24 carbon atoms, such as ricinoleic acid esters, with a monoester of a dicarboxylic acid

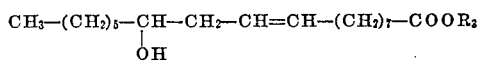

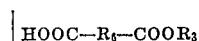

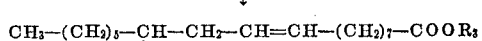

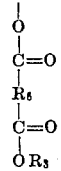   (XI)

wherein $R_6$ is an aliphatic divalent hydrocarbon group containing two to 10 carbon atoms which can be saturated or which contain an ethylenic double bond which is epoxidized on reaction with the percarboxylic acid.

The monoesters used in the preparation of the epoxidized esters are preferably monoalkyl esters of succinic, glutaric, adipic, pimelic, suberic, azelaic or sebacic acids. Other acid esters known to those skilled in the art can also be used in the practice of this invention.

The ester (XI) can thus be epoxidized in a conventional manner to form the following compound:

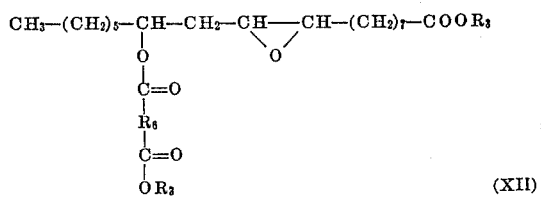
(XII)

In addition, use can be made of epoxidized triglycerides which, as well known to those skilled in the art, are triesters having the general formula

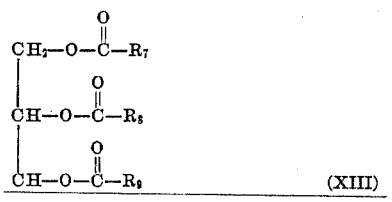
(XIII)

wherein $R_7$, $R_8$ and $R_9$ are each hydrocarbon groups containing four to 24 carbon atoms, and at least one of which contains at least one epoxy group. Such epoxidized esters are commercially available from Swift and Company under the trademarks "Epoxal 7-4," which is an epoxidized soybean oil (triglyceride) having a minimum oxirane oxygen content of 7.0 percent by weight, and "Epoxal 9-5" which is an epoxidized triglyceride having a high oxirane oxygen content (9.0 percent by weight minimum).

As indicated above, in the practice of the present invention, the epoxidized esters as described above are reacted with an amine compound, an epoxy compound or a carboxyl compound to form a glass fiber size composition having improved compatibility and bond with resorcinolaldehyde resin - elastomer impregnating compositions.

A wide variety of amine compounds can be reacted with the foregoing epoxides. Representative amine compounds are the alkylene polyamines including ethylene polyamines, such as ethylene diamine, diethylene triamine, triethylene tetramine, tetraethylene pentamine; polyethylene imines having the formula

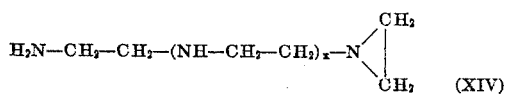
(XIV)

wherein x is an integer; lower alkanol amines such as ethanol amine, propanol amine, diethanol amine, etc.; and amino-substituted organo silicon compounds, such as amino and polyamino silanes having the formula

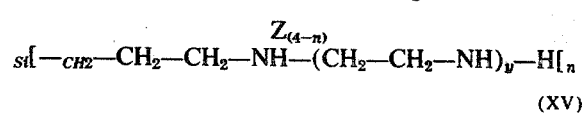
(XV)

wherein n is an integer from 1 to 3, y is zero or an integer from 1 to 5, and Z is a readily hydrolyzable group such as halogen (chlorine, fluorine, bromine, iodine) or alkoxy having one to four carbon atoms, such as methoxy, ethoxy, etc., or hydrogen. Illustrative of such amino alkyl silanes are gamma-aminopropyltriethoxy silane, N-beta(aminoethyl)-gamma-aminopropyltrimethoxy silane.

Other suitable amino silanes include hydroxy-alkyl-substituted amino alkyl silanes having the general formula:

$$[(HO-R_{10}) - NH - (CH_2)_3]_n \, Si \, Z_{(4-n)}$$

(XVI)

wherein $R_{10}$ is an alkylene group having one to six carbon atoms, such as methylene, ethylene, etc., and n and Z have the same values as pointed out above. Illustrative of this class of compound is N-(beta-hydroxyethyl)-gamma-aminopropyltriethoxy silane.

While the proportions in which the epoxides are reacted with the amino compounds are not critical, it is generally preferred to employ between 0.1 and 10 moles of amine per mole of epoxidized material. The reaction can be conveniently carried out by admixing the amine with the epoxide, in the presence of an inert solvent as desired, and then heating the reaction mixture to a temperature within the range of 40°–200°C for a period of one-half to 6 hours. It is generally preferred that the resulting size composition contain 5–45 percent by weight of the reaction product.

Similarly, a wide variety of glycidoxy compounds can be reacted with the elastomer materials to provide a glass fiber size or impregnant, and include compounds having the group:

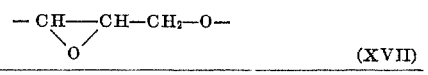
(XVII)

Preferred glycidoxy compounds are those having the formula:

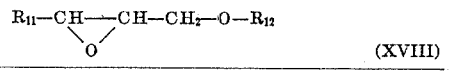
(XVIII)

wherein $R_{11}$ is hydrogen or alkyl having one to six carbon atoms such as methyl, ethyl, propyl, etc.; and $R_{12}$ is hydrogen or an organic group such as alkyl having one to 10 carbon atoms, such as ethyl, propyl, isobutyl, etc.; aryl having six to 15 carbon atoms such as phenyl, naphthyl, etc.; alkylaryl having seven to 15 carbon atoms, such as benzyl, ethylphenyl, methyl naphthyl, etc.; cyclobutyl, cyclohexyl, etc. Other groups represented by $R_{12}$ may be glycidyl, amine substituted alkyl having one to eight carbon atoms and one to three amino groups.

It is frequently preferred to employ glycidoxy organo silanes for reaction with the elastomer compatible materials set forth above in order to provide enhanced adhesion of the elastomer compatible material to glass fibers. Preferred silanes are those having the formula:

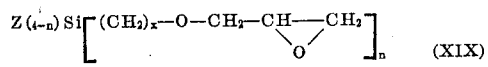
(XIX)

wherein n and Z have the meanings set forth above and x is an integer from 2 to 5.

Illustrative of suitable glycidoxy compounds are 2,3-epoxypropyl methyl ether, 2,3-epoxypropyl vinyl ether, 2,3-epoxypropyl-2-aminoethyl ether, di(glycidoxypropyl)dimethoxy silane as well as a variety of others.

It is generally preferred to react the glycidoxy compound with the epoxidized ester in proportions such that there are about 0.1 to 10 moles of the glycidoxy reacted with 1 mole of the resin. While not essential, it is preferred to use a Lewis acid catalyst, such as boron trifluoride, in order to accelerate the rate of reaction. Reaction may be conveniently carried out by admixing the glycidoxy compound with the epoxidized ester and heating the reaction mixture to a temperature within the range of 20 to 200°C for a period of one-half to 6 hours.

It will be understood that a wide variety of compounds containing at least one carboxyl group may be employed in accordance with this concept of the present invention. Generally preferred carboxyl organo silanes are those having the formula:

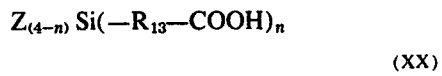
(XX)

wherein n and Z have the meaning set forth above, and $R_{13}$ is an organic groups such as alkylene having 1-9 carbon atoms, such as methyl, trimethyl, tetramethyl, etc.; arylene having six to 10 carbon atoms, such as phenylene, naphthylene, etc., or cycloalkylene having four to 10 carbon atoms such as cyclopentylene, cyclohexylene, etc. The silanes may be conveniently prepared by hydrolyzing the corresponding chloro-organo silane, and then oxidizing the resulting alcohol with, for example, permanganate.

Illustrative of this group of compounds are beta-carboxyethyltrimethoxy silane, gamma-carboxypropyltriethoxy silane, para-carboxyphenyldiethoxy silane, bis(beta-carboxyethyl)diethoxy silane as well as a wide variety of others.

It will similarly be understood that a wide variety of non-silicon containing carboxyl compounds may be employed in lieu of the silanes described above. Representative compounds are those having the formula:

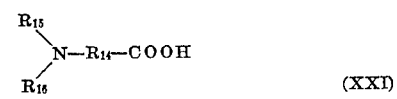
(XXI)

wherein $R_{15}$ and $R_{16}$ are preferably hydrogen or alkyl having one to eight carbon atoms, and $R_{14}$ is a divalent organic radical, including alkylene having one to 12 carbon atoms, such as methylene, ethylene, etc.; and arylene having six to 20 carbon atoms, such as phenyl, naphthyl, phenylene methylene, methylene phenylene, etc.; and monoamides of a polycarboxylic acid having the formula

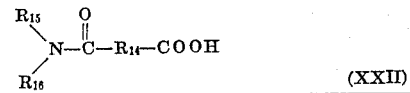
(XXII)

wherein $R_{14}$, $R_{15}$ and $R_{16}$ have the meanings set forth above.

Suitable compounds include alpha-aminoacetic acid, betaalanine, gamma-aminobutyric acid, para-aminobenzoic acid, para-amino-beta-phenylpropionic acid, m-aminomethyl-alpha-phenyl acetic acid, N,N-dimethyl-para-aminobenzoic acid, the monoamide of malonic acid, the monoamide of succinic acid, the monoamide of terephthalic acid, the N,N-dimethyl monoamide of pimelic acid, etc.

It is generally preferred to react between 0.1 and 20 moles of the carboxy compounds per mole of epoxidized ester. The reaction may be conveniently carried out by admixing the reactants and then heating the reaction mixture to a temperature within the range of 40° to 200°C for a period of one-half to 6 hours.

After the glass fibers have been sized with the reaction product of the epoxidized ester, the glass fibers are impregnated with an impregnating composition containing a resorcinol-aldehyde resine and an elastomer. Such impregnating compositions are of themselves well known to those skilled in the art as described in U.S. Pat. Nos. 3,402,064, 3,424,608, 3,567,671, 3,591,357 and others.

Without limiting the present invention as to theory, it is believed that the effectiveness of the size compositions employed in the practice of the invention in promoting a secure bonding relationship with impregnants as described above to intertie bundles of glass fibers to elastomeric materials in the manufacture of glass fiber reinforced elastomeric products resides at least in part in the fact that the resorcinolaldehyde resin component of the impregnant, when prepared by reaction of at least two moles of aldehyde per mole of resorcinol, contains free alkanolyl groups

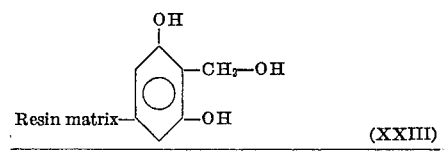
(XXIII)

which are reactive with either the epoxidized polyester or the amine, glycidoxy compound or carboxy compound to chemically bond the impregnant to the sized fibers.

For example, when the compound with which the ester is reacted is an organo silicon compound as described above, the organo silicon compound is reactive with the epoxy group to bond the ester to the glass fiber surface in accordance with the following, using gamma-aminopropyltriethoxy silane as illustrative:

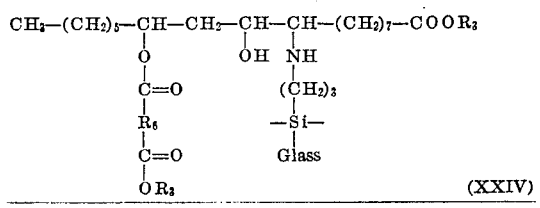
(XXIV)

to leave the ester groups OR₃ available for reaction with the alkanolyl groups of the resorcinol-aldehyde resin by way of a trans-esterification reaction:

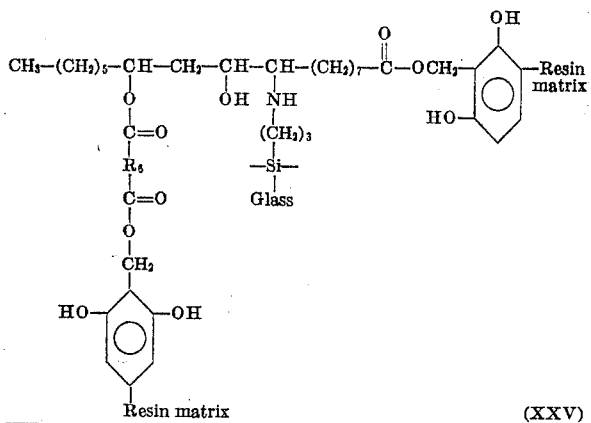
(XXV)

As those skilled in the art will appreciate, the glycidoxy and carboxy silanes described above are capable of undergoing similar reactions:

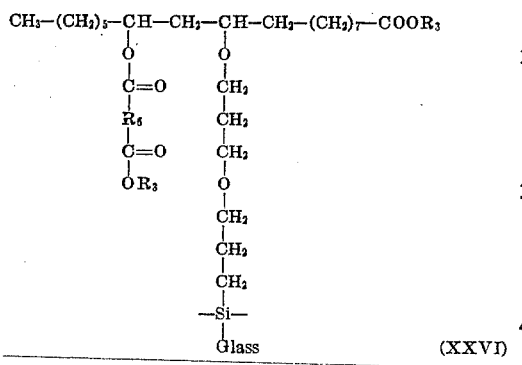
(XXVI)

and

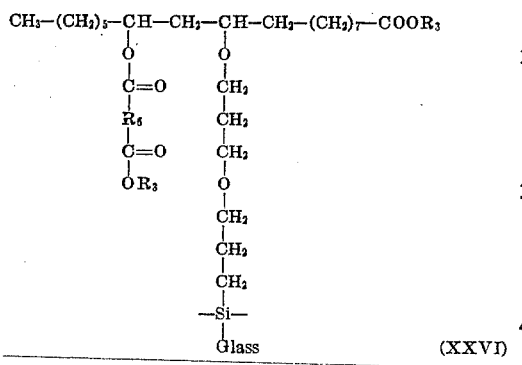
(XXVII)

Where the compound with which the epoxidized ester is reacted is one of the compounds described above which does not contain a silicon atom, the compound serves to intertie the resorcinol-aldehyde resin component of the impregnant to the thin coating on the glass fibers and to cross-link the epoxidized ester on the glass fiber surfaces. For example, the polyalkylene amines described above are capable of producing the following:

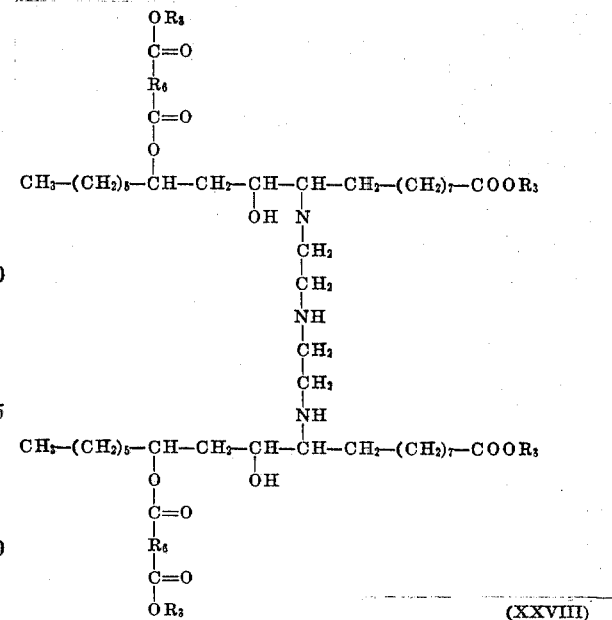
(XXVIII)

In addition to forming the reaction product described above, the amines are likewise capable of chemically bonding the resorcinol-aldehyde resin component to the thin coating as illustrated by the following:

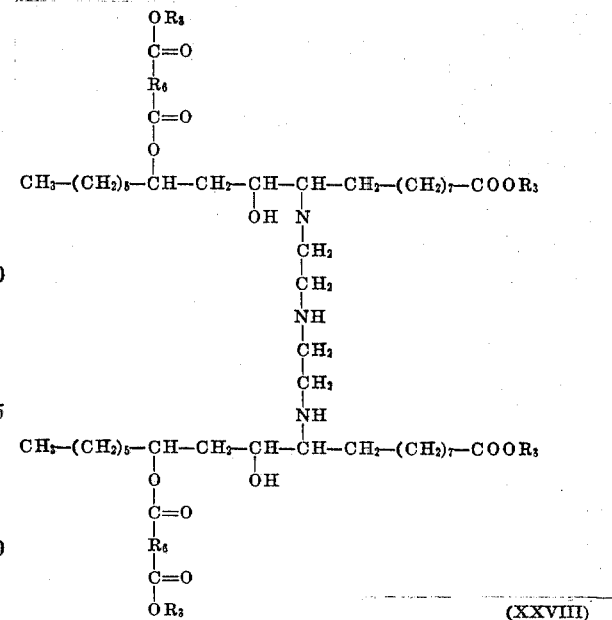
(XXIX)

As will be appreciated by those skilled in the art, the other amines described above are capable of undergoing analogous reactions.

The amino acids and monoamides described above are capable of chemically bonding the resorcinol-aldehyde resin component to the ester size by way of the following:

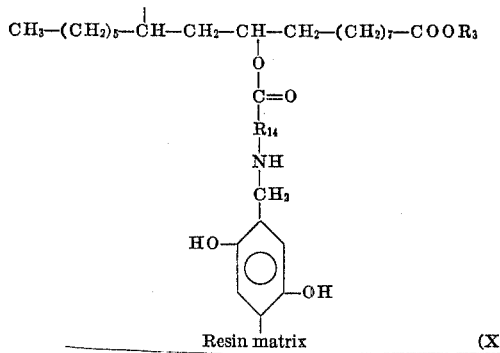
(XXX)

and

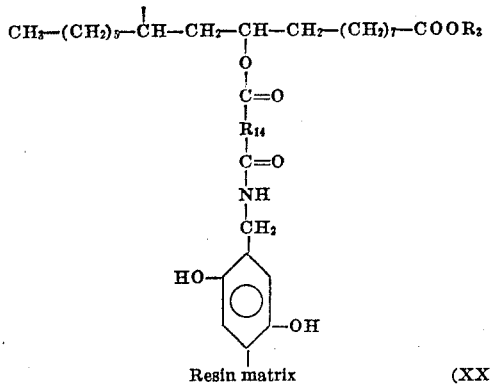

Resin matrix                                    (XXXI)

Having described the basic concepts of the invention, reference is now made to the following examples which are provided by way of illustration but not of limitation, of the practice of the invention.

EXAMPLE 1

This example illustrates the concepts of the present invention as applied in forming a one-component size for use with glass fibers.

One mole of an epoxidized fatty ester having the formula:

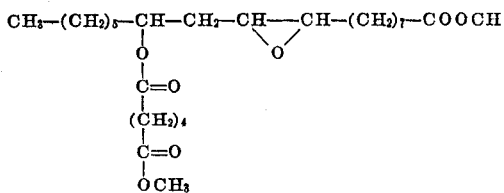

(which is prepared by reacting ricinoleic acid with the monomethyl ester of adipic acid and then epoxidizing the resulting product) is reacted with one mole of tetraethylene pentamine by dissolving the amine with 2 liters of water, adding the ester to the solution at room temperature, and heating the resulting mixture to 90°C for a period of 4 hours.

The resulting solution is diluted with sufficient water to provide a solution containing about 20 percent by weight of the reaction product. The solution of the reaction product is then applied to glass fibers in accordance with the method described in U.S. Pat. No. 3,424,608 wherein the individual glass fiber filaments are sized with the composition as they are gathered together to form a strand by means of an applicator, such as a wiping pad which is constantly wet with the forming size composition in order to deposit on the glass fiber surfaces the reaction product of the epoxide and the amine as a thin film in an amount constituting 1–12 percent by weight of the sized glass fibers.

The sized or coated glass fibers are allowed to air dry, or drying of the thin coating on the individual fibers can be accelerated by exposure to an elevated temperature if desired. The strand of sized glass fibers is preferably plied with other strands and twisted to form yarns, threads or cords, generally referred to in the art as bundles, which may be used as reinforcement for elastomeric materials, with or without cutting to short lengths, and which can be formed into woven or nonwoven fabrics for subsequent combination with elastomeric material.

After the sized glass fibers have been formed into bundles as described above, the bundles of sized fibers are impregnated with a composition of the type described in U.S. Pat. No. 3,567,671 as follows:

Impregnating Composition

|   | Parts by wt. solids |
|---|---|
| Resorcinol-formaldehyde resin (Penacolyte R 2170) | 6 |
| Vinyl pyridine-butadiene-styrene terpolymer | 40 |
| Vinyl chloride-vinylidene chloride copolymer | 25 |
| Microcrystalline paraffin wax | 6 |

Water constitutes the balance of the composition and is present in an amount to adjust the solids content of the impregnating composition to 20 to 55 percent by weight. Impregnation can be carried out in accordance with the procedure described in U.S. Pat. No. 3,424,608 to deposit in the glass fiber bundle dry solids constituting 10 to 30 percent by weight of the bundle.

The resorcinol-formaldehyde resin component employed in Example 2 is prepared by reaction of about 8 moles of formaldehyde per mole of resorcinol, and thus contains free methylol groups attached to the resorcinol group. It is believed that the reaction between the resorcinol-aldehyde resin and the epoxidized ester reaction product occurs primarily during drying of the impregnated bundle. Such drying is generally carried out at a temperature within the range of 100° to 350°F, although the drying temperature is not critical. If desired, use can be made of hot air, microwave, dielectric or the like drying ovens.

EXAMPLE 2

One mole of the epoxidized fatty ester employed in Example 1 is reacted with 165 g of a polyethyleneimine of the formula:

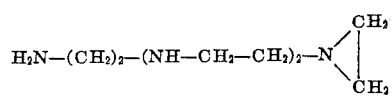

in the same manner as shown in Example 1. An aqueous solution of 25 percent by weight of the product is applied to glass fibers in forming by the method employed in Example 1.

Thereafter, the bundle of the sized glass fibers is impregnated with the following Impregnating Composition

|   | Parts by wt. |
|---|---|
| Resorcinol-formaldehyde resin (Penacolyte) | 6 |
| Vinyl pyridine-butadiene-styrene terpolymer | 25 |
| Water for solids content of 30% by weight |   |

The resulting impregnated bundle is dried at 160°F.

In general, impregnating compositions employed in the practice of the invention are formulated to contain, on a solids basis, from 2 to 10 parts by weight of the resorcinolaldehyde resin per 20 to 60 parts by weight of the elastomer component.

EXAMPLE 3

The epoxidized ester employed in Example 1 is reacted with N-beta(aminoethyl)-gamma-aminopropyltriethoxy silane at room temperature in an aqueous solution containing the ester and the amine in a molar ration of 3:1.

The resulting product is then diluted with water and applied as a size to glass fibers as they are formed. The sized fibers are formed into a bundle of five strands plied and twisted together which can be impregnated with the following impregnating composition of the type described in U.S. Pat. No. 3,567,671, except that the vinyl chloride-vinylidene chloride copolymer is replaced by a dicarboxylated butadiene-styrene resin latex:

Impregnating Composition

|  | Parts by wt. |
| --- | --- |
| Resorcinol-formaldehyde resin | 2–10 |
| Vinyl pyridine-butadiene-styrene terpolymer | 20–60 |
| Dicarboxylated butadiene-styrene copolymer (Pliolite 4121 from Goodyear) | 15–40 |
| Microcrystalline wax | 3–30 |

EXAMPLE 4

228 grams of an epoxidized soya oil having a minimum oxirane oxygen content of 7 percent (Epoxol 7-4) is reacted with 1 mole of ethylene diamine. A viscous liquid is produced which is dispersed in water and applied as a size to glass fibers in an amount constituting 2–20 percent by weight of the sized glass fibers.

Glass fibers sized with the reaction product are then formed into a bundle and subjected to impregnation with the following

Impregnating Composition

|  | Parts by wt. |
| --- | --- |
| Resorcinol-formaldehyde resin | 6 |
| Butadiene-styrene rubber | 29 |
| Water to solids content of 25% by weight |  |

EXAMPLE 5

The diethyl ester of 2-octenedioic acid is epoxidized with peracetic acid to produce an epoxidized ester having the formula

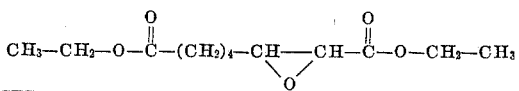

The resulting epoxidized ester is then reacted with deltaaminobutyltriethoxy silane by refluxing the reactants in ethanol for 4 hours.

The reaction product is then dispersed in water to form a size coating on glass fibers. Thereafter, the glass fibers are formed into a bundle which is subjected to impregnation with a composition of the type described in U.S. Pat. No. 3,424,608 formulated as follows:

Impregnating Composition

|  | Parts by wt. |
| --- | --- |
| Resorcinol-formaldehyde resin | 5 |
| Vinyl pyridine-butadiene-styrene terpolymer | 15 |
| Neoprene rubber | 25 |
| Butadiene rubber | 5 |

EXAMPLE 6

An epoxidized oleic ester having the formula

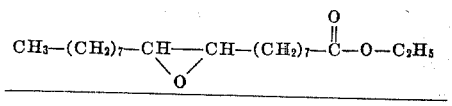

is reacted with N-(beta-hydroxyethyl)-gamma-aminopropyltrimethoxy silane in accordance with the procedure described in Example 5.

Glass fibers sized with the reaction product are formed into bundles which are subjected to impregnation with the following impregnating composition:

Impregnating Composition

|  | Parts by wt. |
| --- | --- |
| Resorcinol-formaldehyde resin | 6 |
| Natural rubber latex | 28 |
| Water to solids content of 35% |  |

EXAMPLE 7

The epoxidized ester used in Example 1 is dispersed in benzene, and gamma-glycidoxypropyltrimethoxy silane is added in an amount to provide a mole ratio between the ester and the silane of 3:1.

A small amount (0.001 moles) of a Lewis acid ($BF_3$) is added and the reaction is allowed to proceed for about 10 minutes. The resulting solution is diluted to provide a 25 percent by weight solution of the product, which is applied to glass fibers in the manner shown in the Example 1.

A bundle of the sized glass fibers is then impregnated with the impregnating composition described in Example 3.

EXAMPLE 8

The epoxidized soya oil of Example 4 is reacted with diglycidyl ether in the presence of a small amount of $BF_3$ for 25 minutes at room temperature.

The resulting product is a viscous oil having good adherence to glass fibers when present thereon as a size coating in an amount constituting 2–20 percent by weight of the sized glass fibers.

A bundle of fibers sized with the reaction product of Example 8 can be subjected to impregnation with any of the impregnating compositions described above.

EXAMPLE 9

The epoxidized fatty acid ester of Example 1 is reacted with beta-carboxyethyltrimethoxy silane in proportions of 3 moles of ester per mole of silane at room temperature.

The silanized product is then dispersed in water to provide an aqueous solution containing 40 percent by weight silanized ester, which is then applied as a size to glass fibers in the manner shown in Example 1.

A cord formed of fibers sized with the above composition is subjected to impregnation with the impregnating composition described in Example 1.

EXAMPLE 10

An epoxidized triglyceride having a minimum oxirane content of 9 percent, and which is marketed by Swift and Company under the trademark "Epoxol 95," is reacted with beta alanime for a period of 3 hours in the presence of $BF_3$. The resinous product is then formulated into a size composition as by dispersing it in water so as to provide a dispersion containing 15 percent by weight of the product.

A bundle of fibers sized with the above is then subjected to impregnation with one of the impregnating compositions described above containing a resorcinol-aldehyde resin component and an elastomer component.

While not equivalent to the epoxides disclosed above, it will be understood that use may be made of other elastomer compatible materials for reaction with the foregoing amines, glycidoxy compounds and carboxy compounds to provide a one-component size composition. For example, use may be made of polyamides containg free carboxy groups, melamine-formaldehyde resins or urea-formaldehyde resins which contain free alkanolyl groups, and carboxylated butadiene-styrene polymers, as indicated by the following examples.

EXAMPLE 11

A low molecular weight urea-formaldehyde resin (average molecular weight of 193) is dissolved in water and reacted with gamma-aminopropyltriethoxy silane by heating the mixture to about 80°C.

The viscous product is separated from the water by heating the mixture at a pressure of about 20 mm of Hg and can be formulated into an aqueous dispersion for use as a glass fiber size.

EXAMPLE 12

A low molecular weight melamine-formaldehyde resin is dissolved in water, and gamma-aminopropyltrimethoxy silane is added to form a reaction mixture containing 0.5 moles of melamine formaldehyde resin and 1.0 mole of silane. The mixtuure is reacted for 30 minutes by heating to about 60°C.

The solvent is then vaporized and a viscous resin remains. The resin is then formulated into a size composition as follows:

| | |
|---|---|
| Aminized melamine-formaldehyde resin | 15.0 % |
| Water | 84.7 % |
| Cationic surfactant (e.g. dodecyl amine) | 0.3 % |

The foregoing size composition is applied to glass fibers as described in Example 1.

EXAMPLE 13

The carboxylated butadiene-styrene latex having a solids content of 45 percent, marketed by Goodyear under the trademark of "Pliolite 480" is reacted with glycidoxy silane used in Example 7 at room temperature for about 15 minutes.

The silanized latex product is diluted with water to provide a solids content of about 25 percent and is applied to glass fibers as a size in forming to deposit any solids on the surfaces of the glass fibers constituting about 6 percent by weight of the sized glass fibers.

EXAMPLE 14

A polyamide having an average molecular weight of 1000 formed from 1.1 moles of adipic acid per 1.0 mole of hexamethylene diamine is reacted with gamma-glycidoxypropyltriethoxy silane in tetrahydrofuran. The resinous product may be dispersed in an aqueous solution by means of a surfactant to provide a dispersion having a solids content within the range of 20–45 percent by weight for use in sizing glass fibers.

EXAMPLE 15

A low molecular weight melamine-formaldehyde (average molecular weight of 2,800) is reacted with alpha-aminoacetic acid at a temperature of 80°C for a period of 4½ hours. The resinous product is dispersed in water to provide a size composition containing 18 percent by weight.

EXAMPLE 16

A polyamide resin containing free carboxy groups formed by the reaction of phthalic acid and hexamethylenediamine having an average molecular weight of 1,347 is reacted with the monoamide of pimelic acid for a period of 5 hours at a temperature of 120°C. The resinous product is then dispersed in water to provide a size composition which can be applied to glass fibers in the manner described in Example 1.

Glass fibers sized with any of the compositions described in Examples 11 to 16 can be subjected to impregnation with the impregnating compositions described above formulated to contain a resorcinol-aldehyde resin component and an elastomer component to chemically bond the sized fibers to the impregnated bundle.

The use of melamine and urea-aldehyde resins in the practice of the invention is particularly advantageous where the resins contain free alkanolyl groups. Such resins are prepared by reacting melamine or urea with an aldehyde in a mole ratio by at least 2:1 and up to 20:1. For example, the melamine resins contain the group

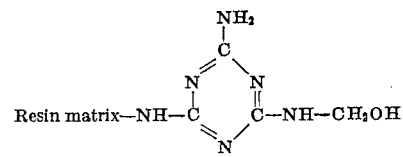

and urea aldehyde resins contain the group

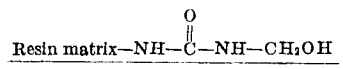

These methylol groups (where the aldehyde is formaldehyde) are reacted with the amines, glycidoxy compounds and carboxy compounds to intertie the resorcinol-aldehyde resin component of the impregnating composition.

In fabricating the combinations of the glass fibers treated in accordance with the practice of this invention, with elastomeric materials, the bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combinations of glass fibers and elastomeric material are processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiber - elastomeric product.

It will be understood that changes may be made in the details of formulation and methods of application or use without departing from the spirit of the invention, especially as defined in the following claims.

We claim:

1. Glass fibers having a thin coating on the individual surfaces thereof, said coating comprising the reaction product of an epoxidized ester [selected from the group consisting of

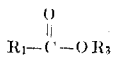

wherein $R_1$ is an aliphatic hydrocarbon group containing five to 23 carbon atoms and substituted from one to three epoxy groups, and $R_3$ is alkyl

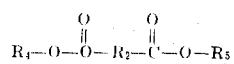

where $R_2$ is an aliphatic hydrocarbon group containing three to 22 carbon atoms and substituted with one to three epoxy groups, and $R_4$ and $R_5$ are each alkyl, an epoxidized triglyceride and a polyester prepared by reacting a hydroxy substituted carboxylic acid alkyl ester with a monoester of the formula $$HOOC - R_6 - COOR_3$$

where $R_6$ is a divalent hydrocarbon group and then epoxidizing the product] having the formula

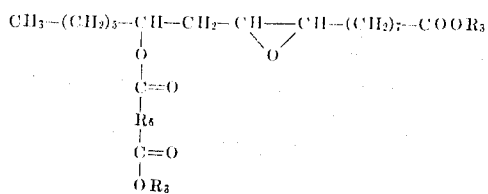

wherein $R_3$ is alkyl and $R_6$ is alkylene or epoxy alkylene containing two to 10 carbon atoms with a compound selected from the group consisting of an amino silane, a glycidoxy silane and a carboxy silane.

2. Glass fibers as defined in claim 1 wherein the compound is an amino silane selected from the group consisting of an aminoalkyl silane and a N-(hydroxyalkyl)aminoalkyl silane.

3. Glass fibers as defined in claim 1 wherein the compound is a glycidoxy silane of the formula

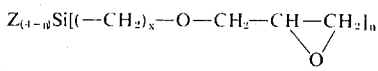

wherein Z is a readily hydrolyzable group, n is an integer from 1 to 3, and x is an integer from 2 to 5.

4. Glass fibers as defined in claim 1 wherein the glass fibers are in the form of a bundle, and the bundle includes an impregnant therein, said impregnant comprising a mixture of a resorcinol-aldehyde resin and an elastomer.

5. Glass fibers as defined in claim 4 wherein the bundle is formed of two or more strands of glass fibers plied and twisted together.

6. Glass fibers having a thin coating on the individual surfaces thereof, said coating comprising the reaction product of an epoxidized ester selected from the group consisting of

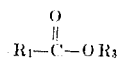

where $R_1$ is an aliphatic hydrocarbon group containing five to 23 carbon atoms and substituted with one to three epoxy groups, and $R_3$ is alkyl,

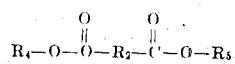

where $R_2$ is an aliphatic hydrocarbon group containing three to 22 carbon atoms and substituted with one to three epoxy groups, and $R_4$ and $R_5$ are each alkyl, an epoxidized triglyceride and a polyester prepared by reacting a hydroxy substituted carboxylic acid alkyl ester with a monoester of the formula $$HOOC - R_6 - COOR_3$$

where $R_6$ is a divalent hydrocarbon group, and then epoxidizing the product, with a compound selected from the group consisting of alkylene polyamines, alkanol amines, polyethylene imines, a glycidoxy compound of the formula

where $R_{11}$ is hydrogen or alkyl and $R_{12}$ is selected from the group consisting of hydrogen, alkyl, amino substituted alkyl, aryl, alkaryl and glycidyl, an amino acid and a monoamide of a polycarboxylic acid.

7. Glass fibers as defined in claim 6 wherein the epoxidized ester is a polyester having the formula

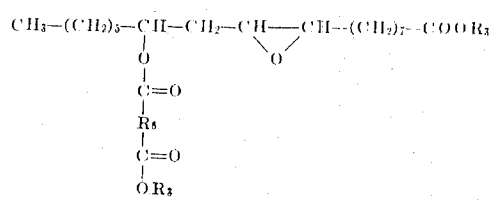

wherein $R_6$ is alkylene or epoxy alkylene containing two to 10 carbon atoms.

8. Glass fibers as defined in claim 6 wherein the glass fibers are in the form of a bundle, and the bundle includes an impregnant therein, said impregnant comprising a mixture of a resorcinol-aldehyde resin and an elastomer.

9. Glass fibers as defined in claim 8 wherein the bundle is formed of two or more strands of glass fibers plied and twisted together.

10. In a glass fiber reinforced elastomeric product wherein an elastomeric material constitutes a continuous phase in which the glass fibers are distributed, the improvement in the bonding relationship between the glass fibers and the elastomeric material comprising glass fibers as defined in claim 1.

11. In a glass fiber reinforced elastomeric product wherein an elastomeric material constitutes a continuous phase in which the glass fibers are distributed, the improvement in the bonding relationship between the glass fibers and the elastomeric material comprising a bundle of glass fibers as defined in claim 4.

12. In a glass fiber reinforced elastomeric product wherein an elastomeric material constitutes a continuous phase in which the glass fibers are distributed, the improvement in the bonding relationship between the glass fibers and the elastomeric material comprising glass fibers as defined in claim 6.

13. In a glass fiber reinforced elastomeric product wherein an elastomeric material constitutes a continuous phase in which the glass fibers are distributed, the improvement in the bonding relationship between the glass fibers and the elastomeric material comprising a bundle of glass fibers as defined in claim 8.

14. Glass fibers having a thin coating on the individual surfaces thereof, said coating comprising the reaction product of a melamine-formaldehyde resin, a urea-formaldehyde resin, a polyamide containing free carboxyl groups and a carboxylated butadiene-styrene resin and a compound selected from the group consisting of an amino silane, a glycidoxy silane, a carboxy silane, an alkylene polyamine, a polyethylene imine, a glycidoxy compound of the formula

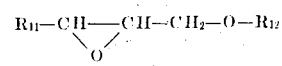

wherein $R_{11}$ is hydrogen or alkyl and $R_{12}$ is selected from the group consisting of hydrogen, alkyl, amino substituted alkyl, aryl, alkaryl and glycidyl, an amino acid and a monoamide of a polycarboxylic acid.

15. Glass fibers as defined in claim 14 wherein the glass fibers are in the form of a bundle, and the bundle includes an impregnant therein, said impregnant comprising a mixture of a resorcinol-aldehyde resin and an elastomer.

16. In a glass fiber reinforced elastomeric product wherein an elastomeric material constitutes a continuous phase in which the glass fibers are distributed, the improvement in the bonding relationship between the glass fibers and the elastomeric material comprising glass fibers as defined in claim 14.

17. In a glass fiber reinforced elastomeric product wherein an elastomeric material constitutes a continuous phase in which the glass fibers are distributed, the improvement in the bonding relationship between the glass fibers and the elastomeric material comprising a bundle of glass fibers as defined in claim 15.

* * * * *